(No Model.)
J. P. MANNY.
LEMON JUICE EXTRACTOR.
No. 415,048. Patented Nov. 12, 1889.
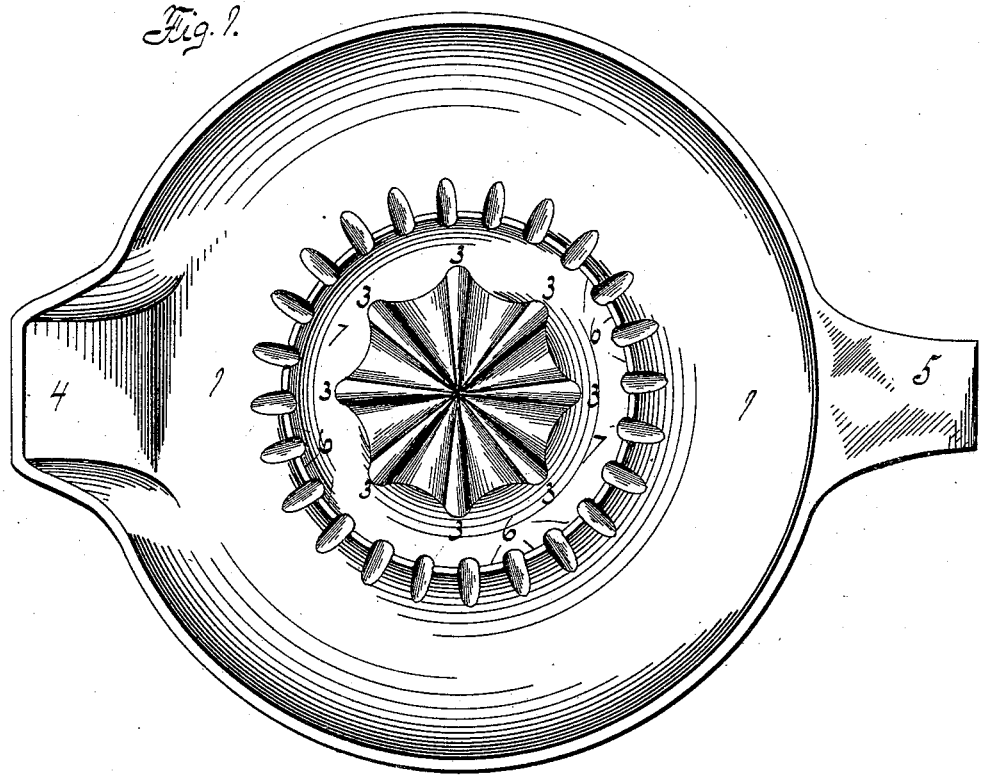
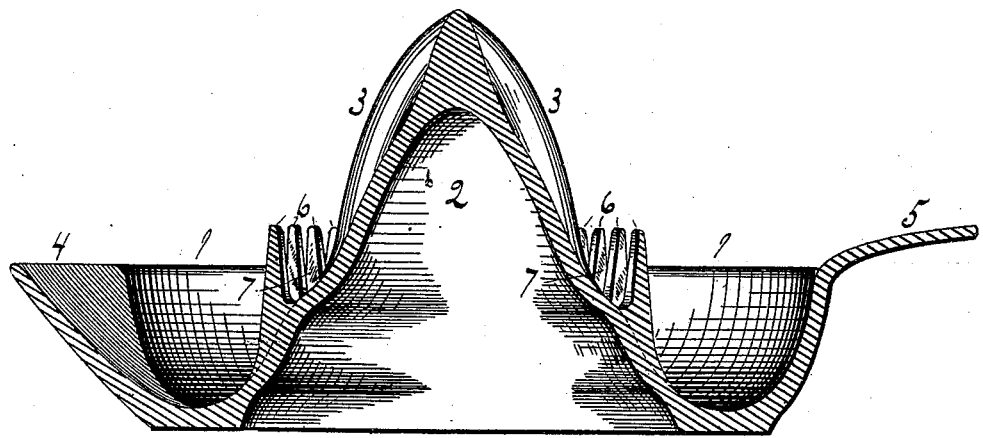
Witnesses:
E. L. Southworth
E. Behel
Inventor:
John P. Manny
By. A. O. Behel
atty.

UNITED STATES PATENT OFFICE.

JOHN P. MANNY, OF ROCKFORD, ILLINOIS.

LEMON-JUICE EXTRACTOR.

SPECIFICATION forming part of Letters Patent No. 415,048, dated November 12, 1889.

Application filed July 27, 1889. Serial No. 318,819. (No model.)

*To all whom it may concern:*

Be it known that I, JOHN P. MANNY, a citizen of the United States, residing at Rockford, in the county of Winnebago and State of Illinois, have invented certain new and useful Improvements in Lemon-Juice Extractors, of which the following is a specification.

The object of this invention is to construct a lemon-juice extractor in the center of the reservoir-base, said base having a series of uprising studs between the outer wall of the base and the extractor which act as a strainer, separating the juice from the pulp and seeds. The reservoir-base is also provided with a spout and handle.

In the accompanying drawings, Figure 1 is a plan view of an extractor embodying my invention. Fig. 2 is a vertical central section through the extractor, spout, and handle.

The base portion 1 of the extractor is in saucer form, forming a reservoir for the reception of the extracted juice. A portion of the bottom of the reservoir is developed into a cone extractor 2, having its exterior surface provided with projections, which in this instance are radial ribs 3, running in the lengthwise direction of the cone.

At one side of the reservoir-base is formed a spout 4, by means of which the extracted juice may be turned out into a receptacle, and a handle 5 in this instance opposite the spout enables the extractor to be handled without soiling the fingers.

Between the cone and outer wall or exit portion of the reservoir is located a strainer, preferably a series of fingers 6, placed in a circle, so that in the extraction of the juice any seeds or pulp that may be extracted will be held within the space 7 between the base of the cone and the fingers, and the juice will flow between the fingers into the reservoir below free from pulp and seeds, and in turning the juice from the reservoir into a receptacle the seeds and pulp will be held by the fingers.

The phrase "exit portion" hereinabove employed is intended to refer to the point or points where the juice after escaping through the strainer leaves the surface of the base which surrounds the conoidal extractor, whether it be at the upper edge of the rim, at the spout, or at other suitable and desired place or places.

By this construction of extractor the juice is separated from the seeds and pulp as fast as it is extracted from the lemon, and the reservoir-base will hold the juice of a number of lemons.

I claim as my invention—

1. A lemon-juice extractor consisting of a reservoir-base, a cone extractor having juice-releasing projections on its surface, and a strainer between the cone and outer edge of the base, substantially as set forth.

2. A lemon-juice extractor consisting of a base, a cone extractor, and a strainer composed of uprising fingers between the cone and outer edge of the base, substantially as set forth.

3. A lemon-juice extractor consisting of a base of dish form, a cone extractor having juice-releasing projections on its surface, and a strainer located above the bottom of the dish-formed portion of the base, whereby the juice is separated from the seeds and pulp as it is extracted, substantially as set forth.

4. A lemon-juice extractor consisting of a reservoir-base, a cone extractor, and a strainer composed of uprising fingers between the cone and outer wall of the base, substantially as set forth.

5. A lemon-juice extractor consisting of a reservoir-base having a spout, a cone extractor, and a strainer composed of uprising fingers between the cone and outer wall of the base, substantially as set forth.

6. A lemon-juice extractor consisting of a base, a cone extractor having juice-releasing projections on its surface, and a strainer located between the cone and the juice-exit portion of the base, substantially as set forth.

JOHN P. MANNY.

Witnesses:
A. O. BEHEL,
E. BEHEL.